United States Patent

[11] 3,565,139

| [72] | Inventor | Eugene T. Olson<br>13460 N. Highway 65, Rte. 4, Anoka,<br>Minn. 55303 |
|---|---|---|
| [21] | Appl. No. | 750,561 |
| [22] | Filed | Aug. 6, 1968 |
| [45] | Patented | Feb. 23, 1971 |

[54] ANGULARLY SHIFTABLE SAW MOUNT
3 Claims, 6 Drawing Figs.

[52] U.S. Cl. .................................................. 143/47;
143/36
[51] Int. Cl. .................................................. B27b 5/18
[50] Field of Search ......................................... 143/47—8,
47—8.1, 6—2, 6—43, 6—47, 36; 144/2.1, 3.6;
143/132.6, 47.6

[56] References Cited
UNITED STATES PATENTS

| 2,741,277 | 1956 | Leger ........................... | 143/47X |
| 3,151,642 | 1964 | Olson ........................... | 143/47X |
| 3,445,147 | 5/1969 | Niemi ........................... | 308/135 |

FOREIGN PATENTS

| 413,331 | 1966 | Switzerland .................. | 143/47X |

Primary Examiner—Andrew R. Juhasz
Assistant Examiner—James F. Coan
Attorney—Dugger, Peterson, Johnson & Westman ABSTRACT: The saw mount comprises a base plate having a circular opening therethrough. Journaled for rotation in the opening is a turntable assembly composed of two circular discs, one disc having an inset central portion so that it abuts the other disc. In this way, a peripheral marginal portion of one disc slidably confronts one side of the base plate and a peripheral marginal portion of the other disc confronts in similar fashion the other side of said base plate. A latching mechanism is carried on the turntable having a plunger that is selectively engageable in any one of several apertures formed in the base plate so that when a power-driven hand saw is attached to the turntable, the turntable can be held in any of several adjusted angular positions. The discs constituting the turntable have aligned slots so that the circular blade of the saw can extend therethrough.

INVENTOR.
EUGENE T. OLSON

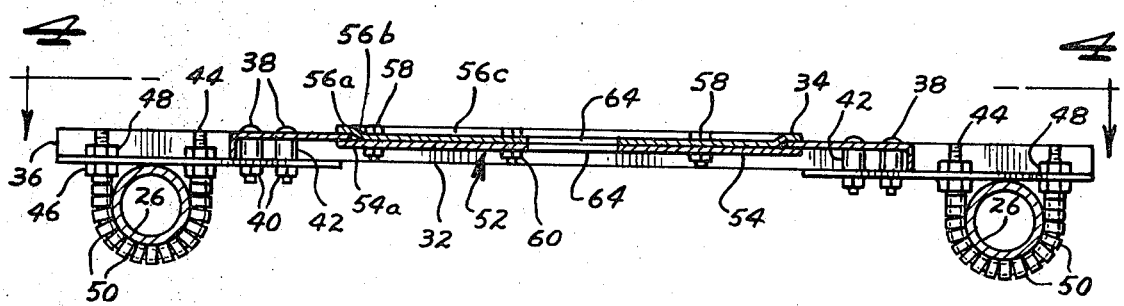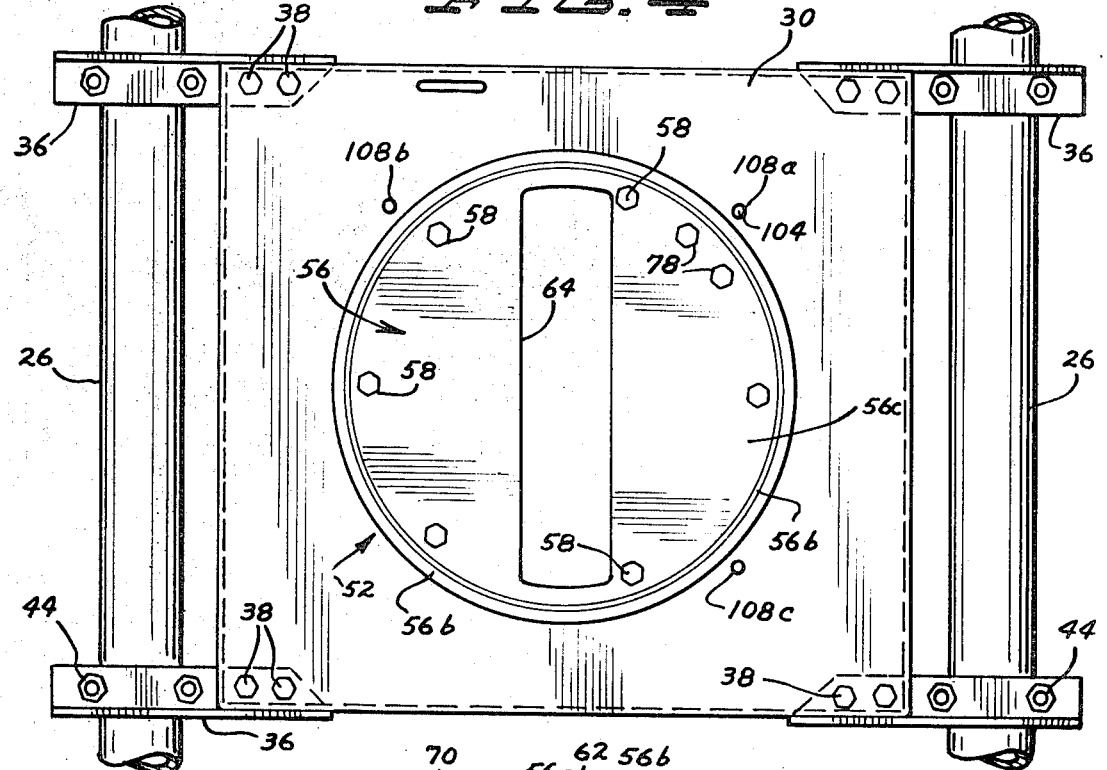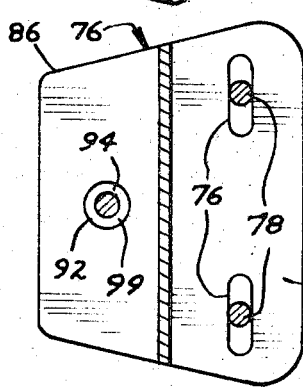

ANGULARLY SHIFTABLE SAW MOUNT

BACKGROUND OF THE INVENTION

1. Field of the Invention

This invention relates generally to apparatus for sawing panel boards and pertains more particularly to an angularly shiftable saw mount therefor.

2. Description of the Prior Art

Apparatus used for the sawing of panel boards is known to the art. Generally this type of apparatus has elements for holding the board to be cut in a substantially vertical position after which a saw, usually of the power-driven type, is pulled downwardly over the board to thereby perform the cutting operation. Such prior art apparatus also has been provided with means for rotating the power-driven hand saw through 90° whereby a horizontal cut may be made on the board as the board is advanced relative to the framework forming a part of the sawing apparatus.

One example of a prior art saw mount is depicted in U.S. Pat. No. 3,151,642, granted on Oct. 6, 1964, to Eugene T. Olson for "ANGULARLY SHIFTABLE SAW MOUNT," the patentee in that instance being the present applicant. While the apparatus depicted in said patent has functioned satisfactorily, it has been relatively costly to manufacture and therefore it has been desirable to fabricate a less expensive saw mount, yet accomplishing the same goals.

SUMMARY OF THE INVENTION

Accordingly, a general object of the instant invention is to provide an angularly shiftable saw mount that can be manufactured at a relatively low cost. In this regard, the invention has for an aim the providing of a turntable assembly that is composed of two circular discs, one disc being inset so as to extend through the opening in the base plate and thereby abut against the disc at the other side of the base plate. The peripheral marginal portions then coact so as to form an annular groove which functions to rotatably journal the turntable assembly.

Another object of the invention is to provide a simplified latching mechanism that will effectively hold the turntable assembly in any of several adjusted positions. It is within the purview of the invention to have the latching mechanism affixed to the assembly so that it can be anchored in alignment with one of the apertures in the base panel, and assuming the other apertures are properly located with respect to the one aperture, then the latching mechanism can be selectively engaged with one of the other apertures, thereby affording a ready means for holding the turntable assembly in a proper rotative position for the particular saw cutting operation that is to be undertaken.

BRIEF DESCRIPTION OF THE DRAWINGS

FIG. 3 is a sectional view taken in the direction of line 3—3 of FIG. 2;

FIG. 4 is a rear elevational view of the saw mount taken in the direction of line 4—4 of FIG. 3;

FIG. 5 is a sectional detail taken in the direction of line 5—5 of FIG. 2 for the purpose of illustrating the latching mechanism, and FIG. 6 is a sectional view taken in the direction of line 6—6 of FIG. 5.

DESCRIPTION OF THE PREFERRED EMBODIMENT

Figure 1:
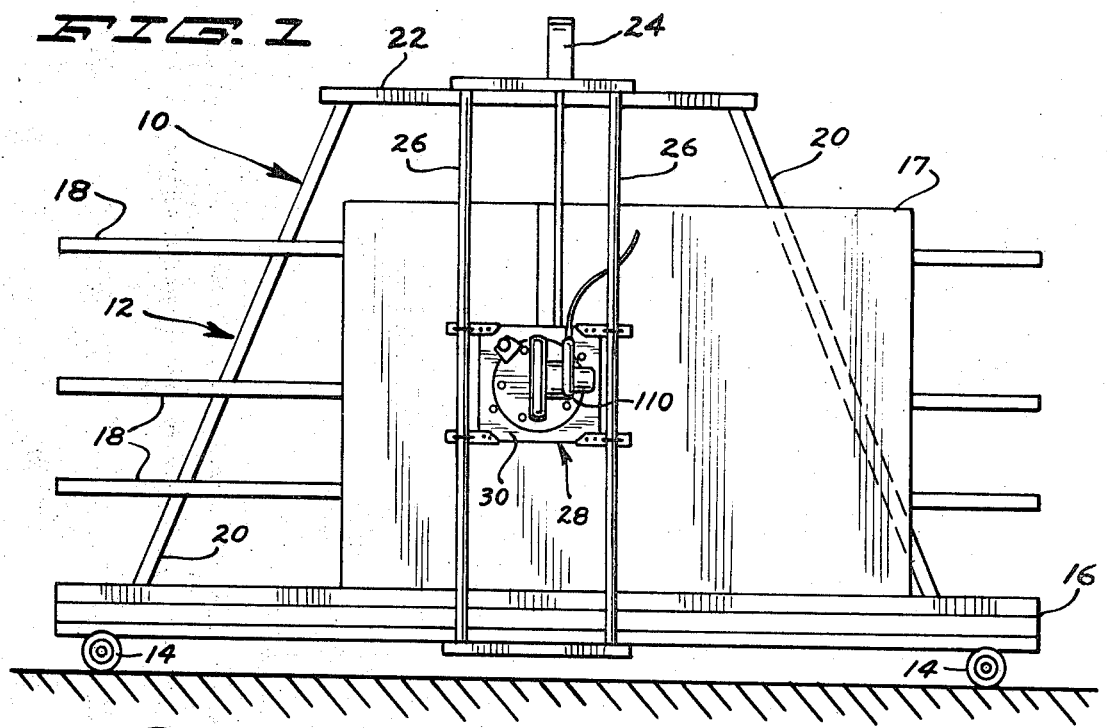
FIG. 1 is a front elevational view of a sawing machine embodying my invention therein.

Before describing the saw mount forming the subject matter of the present invention, it will be of assistance to refer briefly to the construction of a typical sheet board cutting machine designated generally by the reference numeral 10. The machine 10 includes a truncated A-frame 12. Rendering the frame 12 mobile in the illustrated instance are wheels 14 as can be seen in FIG. 1. The frame includes a horizontal bottom channel member 16 containing rollers (not visible) on which a panel board 17 may be advanced when making a horizontal saw cut. The frame 12 further includes horizontal members 18 at different vertical locations, and a pair of inclined bars 20. A top bar 22 supports a counterbalancing mechanism 24. It will be understood that the various members 16, 18, 20 and 22 are suitably connected together so that the frame 12 constitutes a single unit. The machine further comprises a pair of spaced vertical standards or tracks 26 which form a guide for the saw mount indicated in its entirety by the reference numeral 28.

Describing the saw mount 28 which is constructed in accordance with the teachings of the present invention, it will be seen that the saw mount 28 includes a base plate 30 having a flange 32 extending around its edges. The base plate 30 is formed with a circular hole 34. Extending laterally in opposite directions from the base plate 30 are four brackets 36. There is a bracket 36 at the upper left-hand corner, one at the upper right-hand corner, one at the lower left-hand corner and one at the lower right-hand corner of the base plate 30. These brackets 36 are attached to the base plate 30 through the agency of a number of bolts 38 having nuts 40 threaded thereon. Tubular spacers 42 encircle the various bolts 38 and maintain the various brackets 36 in the same general plane of the base plate 30. The base plate 30 is intended to be moved up and down in a vertical direction along the standards or tracks 26. To accomplish this, a U-bolt 44 is carried by each of the brackets 36, being held in place by a first nut 46 and a second nut 48. A number of tubular sleeves or bands 50 encircle the various U-bolts 44 and function to minimize the friction as the base plate 30 is moved upwardly and downwardly. In other words, the various tubular sleeves or bands 50 serve as bearings and it is these bearings that actually slidably engage the standards 26.

Contributing appreciably to the low cost aspect of the saw mount 28 as far as its fabrication is concerned is a turntable assembly 52 comprised of a front circular disc 54 and a back circular disc 56. Any preferred number of bolts 58 extend through these discs and they are held in juxtaposition with respect to each other by means of nuts 60 attached to the various bolts 58. Describing the rear disc 56 with greater particularity, it will be discerned, particularly from FIGS. 3 and 5, that this disc is actually of a slightly concave or dished configuration. What will be termed a peripheral marginal portion 56a of the disc 56 slidably confronts one side of the base plate 30; an angled annular intermediate portion 56b extends in the direction of the front circular disc 54 and a central portion 56c is inset so that it abuts or engages the central portion of the disc 54. It will be appreciated that the front disc 54 is planar, the marginal portion labeled 54a thereof being in the same plane as its central portion 54b which is engaged by the central portion 56c. Because of the planar configuration of the disc 54, there really is no line of demarcation between its portions 54a and 54b, but by labeling these portions in this way a ready way of identification and comparison is afforded with the shape of the disc 56. Consequently, the two discs 54 and 56, owing to their configuration, form a groove 62 that receives therein the inwardly extending marginal portion belonging to the base plate 30. It is in this way that the turntable assembly 52 is journaled for rotation within the circular opening 34, the portion 56c being inset and lying in the plane of the base plate 30. It will be appreciated that the disc 56 can readily be stamped so as to assume the configuration herein mentioned. Also, the same stamping operation can form a slot 64 in this particular disc 56 and similar slot 64 can be formed in the other disc 54. The various bolts 58 and the nuts 60 mounted thereon serve to hold the slots 64 in alignment for a purpose hereinafter mentioned.

At this time, attention is directed to a latching mechanism denoted by the reference numeral 70. The mechanism 70 includes a bracket 72 having a flange 74 formed with a pair of spaced slots 76 therein. A pair of bolts 78 extend through these slots 76 and through circular apertures provided in the discs 54 and 56, one such aperture in the disc 54 being depicted in dotted outline at 79a (FIG. 5) and one aperture in the disc 56 by the numeral 79b (also FIG. 5). Nuts 80 allow the latching mechanism 70 to secured in the proper location, the slots 76 affording sufficient clearance and freedom with respect to the bolts 78 so that the mechanism 70 can be positioned at the correct location.

Describing further the latching mechanism 70, it will be perceived that the bracket 72 includes a channel 82 having parallel flanges 84, 86 and a connecting web 88. Holes 90 and 92 are provided in the flanges 84 and 86, these holes being in alignment with each other but the hole 92 being somewhat larger than the hole 90.

Still further, the latching mechanism 70 includes a plunger or shaft 94 on which is mounted a pull knob 96. A ferrule or bushing 98 is pressed onto the plunger or shaft 94, providing a sleeve portion 99 having a shoulder 100 for a purpose presently to be explained. The bushing 98 has an integral collar 102 intermediate its ends which performs a limiting function and an integral locking pin or tip 104. A compression spring 106 circumscribes the plunger or shaft 94, bearing against the flange 84 and the previously mentioned shoulder 100. In this way, the compression spring 106 biases or urges the locking tip or pin 104 toward the turntable assembly 52.

Figure 2:
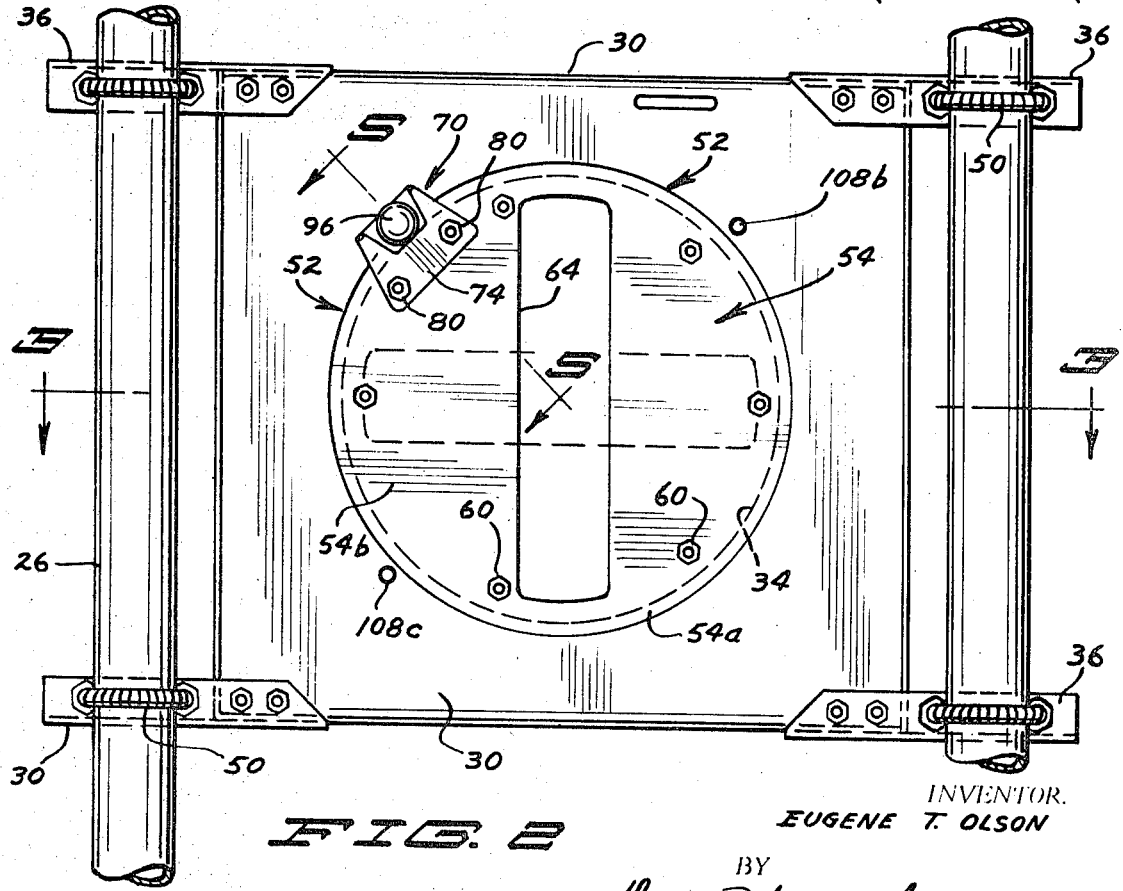
FIG. 2 is a front elevational view of the saw mount shown in FIG. 1 on a larger scale and with the power saw removed.

Actually, the locking tip or pin 104 is insertable in any one of several apertures 108a, 108b or 108c. The apertures 108a, 108b and 108c are located so as to allow the turntable assembly 52 to be positioned with the slots 64 (really only one when the discs 54 and 56 are bolted together) vertical as shown in FIGS. 2 and 3, this being when the pin 104 is engaged in the aperture 108a or the aligned slots 64 can be shifted either clockwise or counterclockwise from the depicted position, the apertures 108b or 108c then being utilized.

The manner in which the turntable assembly 52 is mounted for rotation in the opening 34 of the base plate 30 is straightforward. All that need be done is to first place the disc 54 at one side of the base plate 30 and the disc 56 at the other side. Then, by means of the various bolts 58 the central portions of the two discs can be secured together to form the previously mentioned groove 62.

The saw mount 28 is then in readiness for the attachment of a power-driven hand saw labeled 110 as pictured in FIG. 1. The circular blade extends through the slots 64 and in this way the saw blade can produce a vertical saw cut by merely moving the saw mount 28 vertically along the standards or tracks 26.

When a horizontal saw cut is to be made, then the user of my saw mount 28 simply pulls the knob 96 to retract the tip or pin 104 from the aperture 108a so that the turntable assembly 52 can be rotated either in a clockwise or counterclockwise direction. Assuming, as viewed in FIG. 2, that the turntable 52 is rotated 90° in a clockwise direction, the latching mechanism 70 will move likewise through 90° and cause the tip or pin 104 to be brought into registry with the aperture 108b. Release of the knob 96 will then allow the spring 106 to urge the tip or pin 104 into the aperture 108b with the consequence that the turntable 52 will then be held in a position so that the horizontal cut can be accomplished. The panel 17 will be moved along the channel 16 so as to cause the saw to form the desired horizontal saw cut. If the panel 17 is moved in the opposite direction, the turntable 52 can be rotated through 180°, the aperture 108c then receiving the tip or pin 104.

If the pin 104 is not at the time of assembly accurately aligned with any one of the apertures 108a, 108b or 108c, the loosening of the nut 80 on the bolts 78 will allow the mechanism 70 to be shifted to effect the desired alignment with the first aperture. The clearance provided by the slots 76 allows this. Assuming that the other apertures are accurately spaced with respect to the first aperture, the 90° angles of rotation of the turntable 52 can be realized.

From the foregoing, it will be recognized, it is believed, that an exceedingly simple and rugged saw mount has been devised, one that can be manufactured at a comparatively low cost without adherence to close dimensional tolerances, yet which will allow properly directed saw cuts to be easily made.

I claim:

1. An angularly shiftable saw mount including a base plate having a circular opening therethrough, a two-piece turntable assembly journaled for rotation in said opening composed of first and second circular discs having peripheral marginal portions slidably confronting opposite sides of said base plate, said first circular disc being generally planar and said second circular disc having an inset central portion residing in the plane of said base plate and abutting the center portion of said first circular disc, said second disc further having an angled annular portion extending outwardly to, and integrally connected with, the peripheral marginal portion of said second disc, whereby the marginal portion of said second disc and said angled portion form a groove with said first disc that receives therein the marginal portion of said base plate adjacent its said circular opening, each of said circular discs having a slot therein, and bolt means securing the central portion of said second circular disc to the central portion of said first circular disc with said slots generally aligned so that a circular saw blade may extend therethrough when a power-driven hand saw is attached to one of said circular discs.

2. An angularly shiftable saw mount in accordance with claim 1 including a locking mechanism attached to the central portion of one of said circular discs having a reciprocal plunger provided with a locking tip thereon, said base plate having angularly spaced apertures therein into which said locking tip may be inserted to releasably hold said turntable assembly in an angularly adjusted position for a saw cutting operation.

3. An angularly shiftable saw mount in accordance with claim 2 in which said latching mechanism includes a flange for attachment to one of said discs, said flange having a pair of slots therein and both of said discs having spaced apertures extending through the central portions thereof, and bolt means extending through said apertures and said flange slots for anchoring said latching mechanism in a preferred position so that said locking tip engages one of the apertures in said base plate when the aligned slots in said discs are either vertical or horizontal.